United States Patent
Carlson

(10) Patent No.: US 10,721,607 B2
(45) Date of Patent: Jul. 21, 2020

(54) METHODS AND SYSTEMS FOR AFFIRMATION OF A BLUETOOTH® PAIRING

(71) Applicant: Roche Diabetes Care, Inc., Indianapolis, IN (US)

(72) Inventor: Craig L Carlson, Fishers, IN (US)

(73) Assignee: Roche Diabetes Care, Inc., Indianapolis, IN (US)

( * ) Notice: Subject to any disclaimer, the term of this patent is extended or adjusted under 35 U.S.C. 154(b) by 0 days.

(21) Appl. No.: 16/469,023

(22) PCT Filed: Dec. 15, 2017

(86) PCT No.: PCT/US2017/066832
§ 371 (c)(1),
(2) Date: Jun. 12, 2019

(87) PCT Pub. No.: WO2018/112417
PCT Pub. Date: Jun. 21, 2018

(65) Prior Publication Data
US 2019/0320309 A1    Oct. 17, 2019

Related U.S. Application Data

(60) Provisional application No. 62/435,458, filed on Dec. 16, 2016.

(51) Int. Cl.
*H04W 4/80*     (2018.01)
*H04W 76/10*    (2018.01)
(Continued)

(52) U.S. Cl.
CPC ........... *H04W 4/80* (2018.02); *H04W 12/003* (2019.01); *H04W 12/06* (2013.01); *H04W 72/082* (2013.01); *H04W 76/10* (2018.02)

(58) Field of Classification Search
CPC ..... H04W 4/80; H04W 72/082; H04W 12/06; H04W 12/003; H04W 52/0241;
(Continued)

(56) References Cited

U.S. PATENT DOCUMENTS

2008/0268776 A1   10/2008  Amendola
2010/0115579 A1   5/2010   Rensin et al.
(Continued)

FOREIGN PATENT DOCUMENTS

WO    2014047853 A1    3/2014

*Primary Examiner* — Andrew Wendell
(74) *Attorney, Agent, or Firm* — Stinson LLP

(57) ABSTRACT

A method is provided for affirming the pairing of BLUETOOTH® enabled devices using an affirmation key. The method is performed by a BLUETOOTH® enabled peripheral computing device. The method includes a) advertising availability of the BLUETOOTH® enabled peripheral computing device for pairing, b) receiving a scan request from a BLUETOOTH® enabled central computing device, c) transmitting a scan response to the BLUETOOTH® enabled central computing device in response to the scan request, d) providing an affirmation value to the BLUETOOTH® enabled central computing device, e) receiving a connection request from the BLUETOOTH® enabled central computing device, f) establishing a connection with the BLUETOOTH® enabled central computing device, g) identifying an affirmation key provided by the BLUETOOTH® enabled central computing device, wherein the affirmation key is provided within an affirmation key characteristic, h) validating that the affirmation key is valid, and i) pairing with the BLUETOOTH® enabled central computing device.

20 Claims, 5 Drawing Sheets

(51) Int. Cl.
*H04W 12/00* (2009.01)
*H04W 12/06* (2009.01)
*H04W 72/08* (2009.01)

(58) Field of Classification Search
CPC ... H04W 76/10; H04B 3/544; H04B 7/18558; H04L 67/141; Y02D 70/20; Y02D 70/10; Y02D 70/14; Y02D 70/26; Y02D 70/146; Y02D 70/144
See application file for complete search history.

(56) References Cited

U.S. PATENT DOCUMENTS

| | | |
|---|---|---|
| 2011/0258462 A1 | 10/2011 | Robertson et al. |
| 2013/0189924 A1 | 7/2013 | Pedro et al. |
| 2013/0259230 A1 | 10/2013 | Polo et al. |
| 2015/0172906 A1* | 6/2015 | Terazaki ............... H04W 76/10 455/434 |
| 2016/0278016 A1* | 9/2016 | Wang ................. H04W 52/0229 |
| 2017/0272405 A1* | 9/2017 | Kerai ................... H04L 63/0428 |
| 2017/0372600 A1* | 12/2017 | Palin ..................... G06F 3/0484 |

\* cited by examiner

METHODS AND SYSTEMS FOR AFFIRMATION OF A BLUETOOTH® PAIRING

CROSS-REFERENCE TO RELATED APPLICATION

This application is a national phase application of PCT Application Publication No. WO2018/112417, filed Dec. 15, 2017, which claims priority to U.S. Provisional Patent Application Ser. No. 62/435,458, filed Dec. 16, 2016, both of which are hereby incorporated by reference in their entireties.

TECHNICAL FIELD

The present disclosure relates generally to the art of BLUETOOTH® enabled computing systems, and more specifically to a method of using an affirmation protocol in BLUETOOTH® pairing to reduce interference during the pairing process.

BACKGROUND

BLUETOOTH® wireless technology (BWT) is used to establish wireless connectivity between computing devices. (BLUETOOTH® is a registered trademark of BLUETOOTH® SIG, Inc., Kirkland, Wash.) BLUETOOTH® enables such devices to connect and communicate with one another efficiently.

BWT utilizes the free and globally available 2.4 GHz radio band. This band is also known as the industrial, scientific, and medical (ISM) radio band. Operation in the ISM band allows BWT to utilize low levels of power while allowing BLUETOOTH® enabled devices within an acceptable range to share data. Each BLUETOOTH® enabled device may simultaneously communicate with many other devices in a variety of topologies supported by the BLUETOOTH® protocol. BWT is used with a variety of products including mobile computing devices, stationary computing devices, computing peripheral devices, smart phones, wearable computing devices, medical computing devices, and vehicular computing devices.

In order for two BLUETOOTH® enabled devices to communicate with one another, the devices must be "paired" to one another. Such pairing is crucial to BLUETOOTH® communication because it helps to assure that BLUETOOTH® enabled devices only communicate with known or approved BLUETOOTH® enabled devices. During pairing, the two devices also "bond" by storing security keys which allows the devices to reconnect at a later point in time and securely exchange data without unnecessary further user intervention after an initial pairing.

BLUETOOTH® bonding involves causing a given pair of BLUETOOTH® enabled devices to become a trusted pair to one another. To achieve pairing, BLUETOOTH® enabled devices complete a specific device discovery and authentication process. Upon completing the pairing and bonding process, each device can automatically transmit and accept communication between them.

In the device discovery process, each BLUETOOTH® enabled device searches for and locates nearby BLUETOOTH® enabled devices to communicate with. Only BLUETOOTH® enabled devices that are in a "discoverable" mode may be located or "discovered."

A BLUETOOTH® enabled device that is scanning for BLUETOOTH® enabled devices is said to be in the device discovery state. A BLUETOOTH® enabled device that is discoverable is said to be in discoverable mode. Upon discovery, the BLUETOOTH® enabled devices may reveal their advertised names and other relevant information before a connection is established between the devices.

Typically, the list of the discovered devices is presented to the user. The user would then be required to select the desired device to be paired with and confirm that the pairing should take place. Thus, the user may instruct the discovering device to pair and bond the devices. Upon such confirmation, the devices establish a relationship by creating a link key that constitutes a "shared secret". The link key is subsequently used to govern communication between the paired devices unless and until the devices are unpaired. Either device may cause an unpairing by deleting its respective link key.

Once the devices are paired and bonded, they may communicate with one another. Even when the devices lose connectivity (e.g., by moving out of range from one another or losing BLUETOOTH® communications access), they may restore communication without re-pairing unless one or both devices lose their respective link information.

Pairing in BLUETOOTH® allows two devices to form a relationship which may be temporary (lasting only for the duration of the present connection), or long term (allowing for reconnections). When a pair of BLUETOOTH® devices are set to pairing mode, the device that requests connection and pairing (referred to as a central device) may display a list of "discovered" devices, which allows the user to select which device (e.g., a peripheral device) to continue the pairing process with.

In known pairing models, during pairing the peripheral device (or the device that does not initiate pairing) does not allow for confirmation of the identity of the central device at the peripheral device. Rather, the known pairing models of Bluetooth allow any device to connect to a peripheral device during pairing. In some examples, the peripheral device may display (at a peripheral screen or other display) information for confirmation or comparison by the user of the central device. For example, the peripheral may display a Passkey that can be re-entered on the central device. Alternatively, the peripheral may display a Numeric Value for comparison at the central device. In the case of Just Works pairing, the peripheral has no direct affirmation with a pairing central device.

As a result, there is vulnerability to peripheral devices during the BLUETOOTH® paring process since a peripheral device has no say in what devices attempt to pair with it while it is in pairing mode. This is both a security problem and a user satisfaction problem. During pairing, the remote device (i.e., the peripheral device) must accept any connection request that it receives from any central device. This 'openness' of the peripheral device to accept connections from unknown central devices allows for improved connectivity. Connectivity is enhanced because the model allows for expedient pairing between devices. However, this model also has a security risk in the event that a malicious central device connects to the peripheral. This model also can result in failed pairing attempts due to a possible mismatch between the central and peripheral device. Such failed pairing may frustrate BLUETOOTH® device users.

SUMMARY OF THE DISCLOSURE

It is the object of this disclosure to overcome the challenges of pairing BLUETOOTH® enabled devices by providing an affirmation mechanism for pairing that prevents a peripheral device from pairing with an undesired central device. The disclosure addresses this difficulty in the following manner.

In one aspect, a method is provided for affirming the pairing of BLUETOOTH® enabled devices using an affirmation key to prevent undesired device interference. The method is performed by a BLUETOOTH® enabled peripheral computing device. The method includes a) advertising availability of the BLUETOOTH® enabled peripheral computing device for pairing, b) receiving a scan request from a BLUETOOTH® enabled central computing device, c) transmitting a scan response to the BLUETOOTH® enabled central computing device in response to the scan request, d) providing an affirmation value to the BLUETOOTH® enabled central computing device, e) receiving a connection request from the BLUETOOTH® enabled central computing device, f) establishing a connection with the BLUETOOTH® enabled central computing device, g) identifying an affirmation key provided by the BLUETOOTH® enabled central computing device, wherein the affirmation key is provided within an affirmation key characteristic, h) validating that the affirmation key is valid, and i) pairing with the BLUETOOTH® enabled central computing device.

In a further aspect, a system is provided for affirming a pairing of BLUETOOTH® enabled devices to prevent undesired device interference. The system includes a BLUETOOTH® enabled peripheral computing device including a first processor, a first memory, and a first transceiver. The system also includes a central BLUETOOTH® enabled computing device including a second processor, a second memory, and a second transceiver. The first processor is configured to a) advertise availability of the BLUETOOTH® enabled peripheral computing device for pairing, b) receive a scan request from the BLUETOOTH® enabled central computing device, c) transmit a scan response to the BLUETOOTH® enabled central computing device in response to the scan request, d) provide an affirmation value to the BLUETOOTH® enabled central computing device, e) receive a connection request from the BLUETOOTH® enabled central computing device, f) establish a connection with the BLUETOOTH® enabled central computing device, g) identify an affirmation key provided by the BLUETOOTH® enabled central computing device, wherein the affirmation key is provided within an affirmation key characteristic, h) validate that the affirmation key is valid, and i) pair with the BLUETOOTH® enabled central computing device.

In another aspect, a BLUETOOTH® enabled central computing device is provided for affirming a pairing of BLUETOOTH® enabled devices to prevent undesired device interference. The BLUETOOTH® enabled central computing device includes a processor, a memory, and a transceiver. The processor is configured to a) transmit a scan request to a BLUETOOTH® enabled peripheral computing device, wherein the BLUETOOTH® enabled peripheral computing device is advertising availability for pairing, b) receive a scan response from the BLUETOOTH® enabled peripheral computing device in response to the scan request, c) receive an affirmation value from the BLUETOOTH® enabled peripheral computing device, d) calculate an affirmation key by applying an affirmation algorithm to the affirmation value, e) transmit a connection request to the BLUETOOTH® enabled peripheral computing device, f) establish a connection with the BLUETOOTH® enabled peripheral computing device, g) write the affirmation key to an affirmation key characteristic associated with the connection, h) transmit a pairing request to the BLUETOOTH® enabled peripheral computing device, and i) pair with the BLUETOOTH® enabled peripheral computing device, wherein the pairing is initiated upon the validation of the affirmation key by the BLUETOOTH® enabled peripheral computing device.

DETAILED DESCRIPTION

Figure 1:
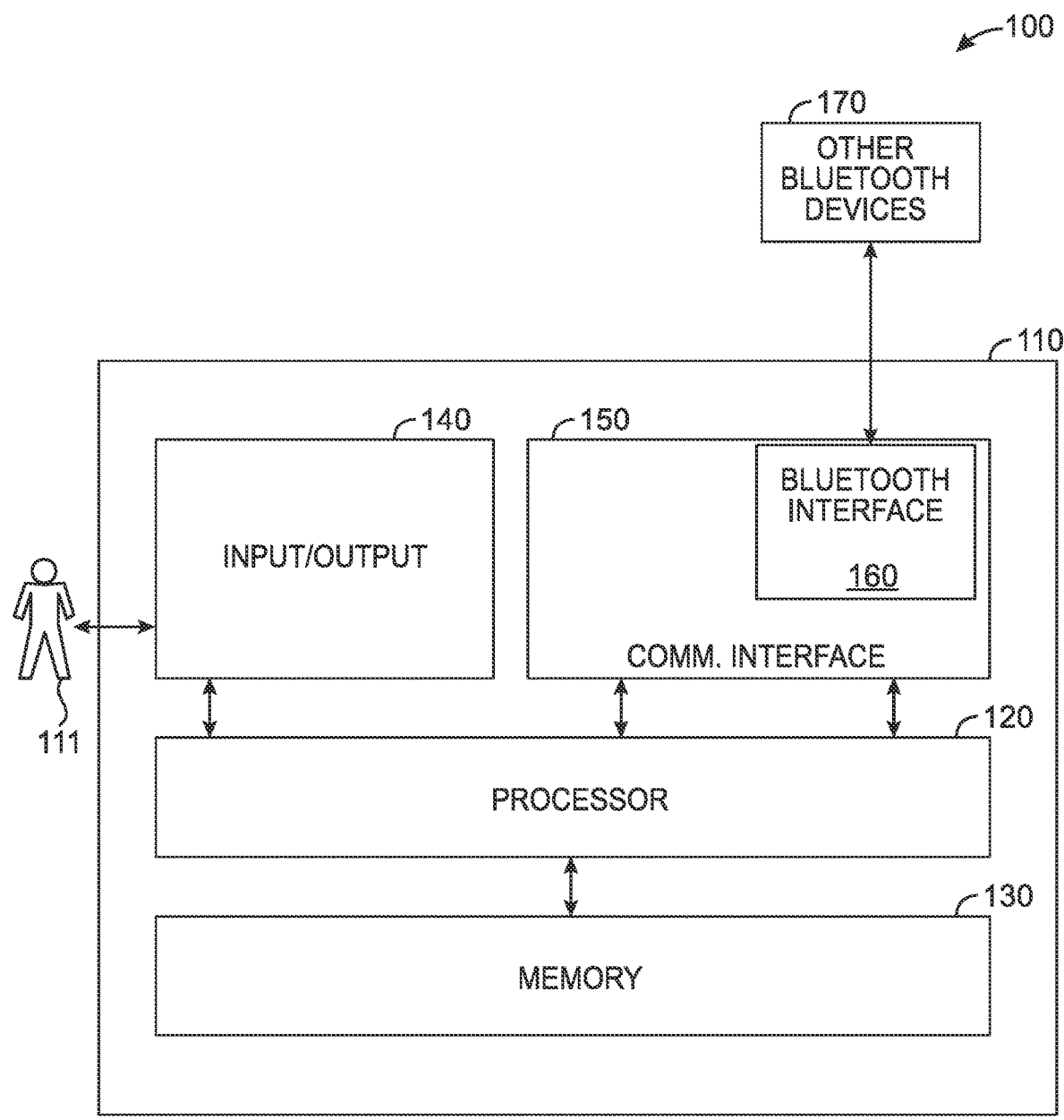
FIG. 1 illustrates an exemplary configuration of a BLUETOOTH® enabled computing device as described herein.

Described herein are methods, a system, and a device for enhanced pairing of BLUETOOTH® enabled devices using a pairing-affirmation method. Specifically, the methods, system, and device use an affirmation key to prevent a peripheral device from BLUETOOTH® pairing with an undesired central device. As a result, the methods, system, and device enable the pairing of two BLUETOOTH® enabled devices without the interference of any undesired central BLUETOOTH® enabled device.

As used herein, the term "central" or "central device" may be used to refer to a BLUETOOTH® enabled device that initiates pairing with a second BLUETOOTH® enabled device that may be referred to as a "peripheral" or a "peripheral device". As such, a central device is synonymous with a local device and a peripheral device is synonymous with a remote device. As used herein, the term "undesired central device" refers to any BLUETOOTH® enabled central device that may connect with a peripheral device that is not intended or desired for pairing with the peripheral device. Such undesired central devices may or may not be malicious devices.

In general, in BLUETOOTH® pairing, a first BLUETOOTH® enabled central device (Central Device A) may seek to pair with and connect to a BLUETOOTH® enabled peripheral device (Peripheral Device B). In one example, a second BLUETOOTH® enabled central device (Central Device C) may also seek to pair with Peripheral Device B. In this example, Peripheral Device B only wishes to pair with a particular device, Central Device A. However, Central Device C may interfere with the desired pairing of Central Device A and Peripheral Device B by transmitting a pairing request to Peripheral Device B before Central Device A does. In a further example, another BLUETOOTH® enabled central device (Central Device D) has previously paired with Peripheral Device B and seeks to reconnect with Peripheral Device B. Similarly, such reconnection effort will interfere with the desired pairing of Central Device A and Peripheral Device B.

The present disclosure addresses these problems caused by the interference of undesired central devices re-pairing or reconnecting with a peripheral device. Specifically, the present disclosure describes the use of an affirmation value provided by the peripheral device (e.g., Peripheral Device B) to approved, new devices that the peripheral device wishes to pair with.

Specifically, in the example embodiment, a BLUETOOTH® enabled peripheral device is set to pairing mode. The BLUETOOTH® enabled peripheral device further advertises in discoverable mode. The BLUETOOTH® enabled peripheral device may advertise in either a limited discoverable or a general discoverable mode. In the example embodiment, the BLUETOOTH® enabled peripheral device is configured to advertise its general availability for pairing with other devices, specifically with BLUETOOTH® enabled central devices. In a first embodiment, the BLUETOOTH® enabled peripheral device advertises its availability and simultaneously transmits an "affirmation value" in the advertising data packets. The affirmation value is a string that, in conjunction with subsequent processing, can be used to affirm that a BLUETOOTH® enabled central device is an authorized user that should be able to pair with the BLUETOOTH® enabled peripheral device. In the example embodiment, the affirmation value is an eight-digit string, but may be of longer length. In other embodiments, the affirmation value may be a string of any length. In further embodiments, the affirmation value may be an alphanumeric string or any other suitable string. Preferably, the affirmation value is sufficiently short and uncomplicated so that it may be processed by an affirmation algorithm (to produce an affirmation key) without consuming significant processor resources on the BLUETOOTH® enabled central device.

In parallel, at least one BLUETOOTH® enabled central device is also configured to discover devices and enters a scanning mode. The BLUETOOTH® enabled central device detects the BLUETOOTH® enabled peripheral device based on the receipt of advertising packets. (In one example, as noted above, the BLUETOOTH® enabled central device receives the affirmation value with the advertising packets. As described below, in other embodiments, the BLUETOOTH® enabled central device receives the affirmation value later.) In response to the advertisement of availability, the BLUETOOTH® enabled central device transmits a scan request to the BLUETOOTH® enabled peripheral device. The BLUETOOTH® enabled peripheral device responds to the scan request with a scan response sent to the BLUETOOTH® enabled central device. In at least one embodiment, the scan response includes an affirmation value. Based on an automated or user selection, the BLUETOOTH® enabled central device selects the BLUETOOTH® enabled peripheral device from a list of "discovered devices" if multiple devices have been discovered. Upon such selection, the BLUETOOTH® enabled central device selects the BLUETOOTH® enabled peripheral device for connection and transmits a connection request to the BLUETOOTH® enabled peripheral device. Upon receiving and accepting the connection request, the BLUETOOTH® enabled peripheral device and the BLUETOOTH® enabled central device establish a connection.

When the connection is established, the BLUETOOTH® enabled peripheral device initiates an "affirmation timer" that measures the time between the device connection and receipt of an "affirmation key". More specifically, the BLUETOOTH® enabled peripheral device is configured to use the affirmation timer to ensure that the time interval between connection and affirmation key receipt does not exceed a defined period. Thus, the measured time reflects the time between the connection and the receipt of the "affirmation key". After the defined period passes, the BLUETOOTH® enabled peripheral device determines that the affirmation timer has expired and the affirmation key can no longer be received as a valid affirmation key. In the example embodiment, the defined period is two seconds and the affirmation timer counts until the two-second window has expired. In other embodiments, the defined period may be shorter or longer as defined by the user. However, the defined period must be sufficiently long to allow for the BLUETOOTH® enabled central device to complete GATT service discovery, complete GATT characteristic discovery, calculate the affirmation key, and write the affirmation key to the pairing affirmation characteristic (or affirmation key characteristic). These steps typically take 0.5 seconds. The defined period must exceed that minimum threshold as defined by the time to complete GATT service discovery, complete GATT characteristic discovery, calculate the affirmation key, and write the affirmation key to the affirmation key characteristic.

As suggested above, after the affirmation timer is initiated upon device connection, the BLUETOOTH® enabled central device performs GATT service discovery and GATT characteristic discovery to learn how the services and characteristics of the BLUETOOTH® enabled peripheral device are defined.

Upon learning how the GATT services and characteristics of the BLUETOOTH® enabled peripheral device are defined, the BLUETOOTH® enabled central device uses an affirmation algorithm to process the affirmation value previously received. The affirmation algorithm represents a calculation that modulates the affirmation value in a predictable, defined manner in order to produce an affirmation key. As a result, the affirmation key is produced as a string that is typically similar to (or reproducibly different from) the form of the affirmation value. In an example embodiment, the affirmation algorithm is an equation that receives the affirmation value as a variable and provides a result of the affirmation key. The affirmation algorithm is previously provided to the BLUETOOTH® enabled central device via any suitable means including software updates, firmware updates, or communications between the BLUETOOTH® enabled central device and management devices that include, but are not limited to, the BLUETOOTH® enabled peripheral device. Further, in the example embodiment, to minimize resource impact on the BLUETOOTH® enabled central device, the affirmation algorithm is typically an algorithm configured to run with little overhead on the processor of the BLUETOOTH® enabled central device.

In at least some examples, the affirmation algorithm may vary based on a type or classification associated with the BLUETOOTH® enabled central device. For example, certain BLUETOOTH® enabled central devices may be defined as associated with particular services, communications, or information. Thus, the affirmation algorithm may be specific to describe a relationship between a particular BLUETOOTH® enabled central device and the BLUETOOTH® enabled peripheral device.

As described below, the BLUETOOTH® enabled peripheral device also has an affirmation algorithm (or affirmation algorithms, in the case that multiple affirmation algorithms exist for multiple device types) to perform validation steps described below.

The BLUETOOTH® enabled central device sends a pairing request to the BLUETOOTH® enabled peripheral device to initiate the actual pairing process. At this step, the BLUETOOTH® enabled peripheral device checks the validity of the affirmation key. Specifically, the BLUETOOTH® enabled peripheral device reads the affirmation key that was written to the affirmation key characteristic (or pairing affirmation characteristic) and validates it on at least two bases. First, the BLUETOOTH® enabled peripheral device verifies that the affirmation key was written to the affirmation key characteristic before the expiration of the affirmation timer. Second, the BLUETOOTH® enabled peripheral device performs a check on the affirmation key itself. Specifically, the BLUETOOTH® enabled peripheral device processes the affirmation value with an appropriate affirmation algorithm to calculate a reference affirmation key. The BLUETOOTH® enabled peripheral device then compares the reference affirmation key to the received affirmation key and confirms that they match, thereby validating that the affirmation key matches the expected result. For security reasons, the BLUETOOTH® enabled peripheral device may then delete the calculated reference affirmation key and the affirmation key.

Upon validation of the affirmation key, the BLUETOOTH® enabled peripheral device determines that the BLUETOOTH® enabled central device is an authorized, valid device for pairing. The communications channel is properly BLUETOOTH® encrypted and security keys are exchanged between the devices. Accordingly, the BLUETOOTH® enabled peripheral device pairs with the BLUETOOTH® enabled central device. The BLUETOOTH® enabled peripheral device performs configuration steps and the BLUETOOTH® enabled central device and BLUETOOTH® enabled peripheral device show confirmations of pairing on their respective display screens. The BLUETOOTH® enabled peripheral device and the BLUETOOTH® enabled central device complete the process of bonding. The devices may then communicate further or disconnect.

In some examples, the BLUETOOTH® enabled peripheral device may further utilize the affirmation mechanism described for reconnection. Specifically, when the BLUETOOTH® enabled central device attempts to reconnect with the BLUETOOTH® enabled peripheral device, the BLUETOOTH® enabled peripheral device may send a communication including a new affirmation value. Like the process described above, in this example, the BLUETOOTH® enabled peripheral device initiates an affirmation timer upon reconnection (rather than connection) and confirms that the BLUETOOTH® enabled central device provides an affirmation key that corresponds to the affirmation algorithm and the new affirmation value within the defined period. In some examples, the affirmation algorithm for reconnection may be distinct from the affirmation algorithm for pairing. As such, the systems described provide authentication services on reconnection and further ensure that an invalid or improper BLUETOOTH® enabled central device is not erroneously communicating with the BLUETOOTH® enabled peripheral device.

As described, the BLUETOOTH® enabled peripheral device is configured to refresh the affirmation values provided to the BLUETOOTH® enabled central devices so that the affirmation values do not become static or "stale". The BLUETOOTH® enabled peripheral device recreates and refreshes affirmation values regularly. In the example embodiment, the affirmation values are recreated at an interval of two minutes.

In some examples, the BLUETOOTH® enabled peripheral device may receive an affirmation key that is timely (i.e., received before the expiration of the affirmation timer), but invalid, because the affirmation key fails to match the calculated reference affirmation key. In such examples, the BLUETOOTH® enabled peripheral device may determine that the BLUETOOTH® enabled central device is suspected to be malicious or otherwise undesirable for pairing. The BLUETOOTH® enabled peripheral device accordingly may issue a new affirmation value to allow the BLUETOOTH® enabled central device another chance to successfully provide a valid affirmation key. Alternatively, the BLUETOOTH® enabled peripheral device may suspend pairing access for the BLUETOOTH® enabled central device.

In further examples, when the BLUETOOTH® enabled peripheral device provides an affirmation value to a BLUETOOTH® enabled central device (in advertisements or scan responses), the BLUETOOTH® enabled central device may fail to respond. In such examples, the BLUETOOTH® enabled peripheral device may similarly provide a new affirmation value or suspend pairing access for the BLUETOOTH® enabled central device based on the non-response.

In such examples wherein the BLUETOOTH® enabled central device provides an affirmation value that is invalid or wherein the BLUETOOTH® enabled central device fails to respond within the requisite defined period, the BLUETOOTH® enabled peripheral device may either maintain the connection or terminate the connection. In at least some examples, when the BLUETOOTH® enabled peripheral device is configured to provide a new affirmation value, it may be configured to maintain the connection to avoid the latency of dropping and restarting the connection.

A technical effect of the systems, methods, and computing devices described herein is to enable affirmation of BLUETOOTH® device pairing between two BLUETOOTH® enabled computing devices when the devices are in the presence of any BLUETOOTH® enabled computing device that could otherwise interfere with the pairing of the BLUETOOTH® enabled computing devices. The described invention accordingly improves the technical field of BLUETOOTH® networking and wireless networking generally by providing such improved pairing capabilities by reducing undesired device interference. Further, the systems, methods, and devices described allow for BLUETOOTH® enabled peripheral devices to only pair with approved, new devices and avoid pairing with unauthorized or previously paired devices. In addition to allowing for pairing with new devices, the systems, methods, and devices also allow for restoration of pairing or bonding with BLUETOOTH® enabled central devices that have lost their pairing or bonding information.

A technical effect of the systems and methods described herein is achieved by performing at least one of the following steps: (a) advertising availability of the BLUETOOTH® enabled peripheral computing device for pairing; (b) receiving a scan request from a BLUETOOTH® enabled central computing device; (c) transmitting a scan response to the BLUETOOTH® enabled central computing device in response to the scan request; (d) providing an affirmation value to the BLUETOOTH® enabled central computing device; (e) receiving a connection request from the BLUETOOTH® enabled central computing device; (f) establishing a connection with the BLUETOOTH® enabled central computing device; (g) identifying an affirmation key provided by the BLUETOOTH® enabled central computing device, wherein the affirmation key is provided within an affirmation key characteristic; (h) validating that the affirmation key is valid; (i) pairing with the BLUETOOTH® enabled central computing device; (j) providing the affirmation value to the BLUETOOTH® enabled central computing device, wherein the affirmation value is embedded within a set of data packets sent when advertising the availability of the BLUETOOTH® enabled peripheral computing device; (k) providing the affirmation value to the BLUETOOTH® enabled central computing device, wherein the affirmation value is embedded within the scan response; (l) processing the affirmation value with an affirmation algorithm to calculate a reference affirmation key; (m) validating that the affirmation key matches the reference affirmation key; (n) deleting the reference affirmation key from local memory; (o) identifying a timer interval defining the period that the BLUETOOTH® enabled central computing device has to respond to the affirmation value by transmitting the affirmation key characteristic including the affirmation key; (p) initiating an affirmation timer upon establishing a connection with the BLUETOOTH® enabled central computing device; (q) measuring a timer value of the affirmation timer when the affirmation key characteristic is provided by the BLUETOOTH® enabled central computing device; (r) validating that the timer value is less than the timer interval; (s) receiving a reconnection request from a previously paired BLUETOOTH® enabled central computing device; (t) providing a second affirmation value to the BLUETOOTH® enabled central computing device; (u) identifying a second affirmation key provided by the BLUETOOTH® enabled central computing device, wherein the second affirmation key is provided within a second affirmation key characteristic; (v) validating that the second affirmation key is valid by processing the second affirmation value with an affirmation algorithm to calculate a second reference affirmation key and validating that the second affirmation key matches the second reference affirmation key; (w) reconnecting with the BLUETOOTH® enabled central computing device; (x) identifying a timer interval defining the period that the BLUETOOTH® enabled central computing device has to respond to the affirmation value by transmitting the affirmation key characteristic including the affirmation key; (y) initiating an affirmation timer upon establishing a connection to the BLUETOOTH® enabled central computing device; and (z) determining that the timer value of the affirmation timer exceeds the timer interval, and providing a replacement affirmation value to the BLUETOOTH® enabled central computing device.

As used herein, the term "processor" refers to central processing units, microprocessors, microcontrollers, reduced instruction set circuits (RISC), application specific integrated circuits (ASIC), logic circuits, and any other circuit or processor capable of executing the functions described herein.

Disclosed herein is a method that includes receiving and sending affirmation values and affirmation keys. Such affirmation value and affirmation key data (along with affirmation algorithms) may be stored in any format on any storage device in or in communication with the BLUETOOTH® enabled computing devices described herein. The computing devices can convert the BLUETOOTH® address data to a format suitable for storage in reserved memory of a communication device to form converted BLUETOOTH® address data. The reserved memory may exist in the form of the pre-defined element of the device's Electrically-Erasable Programmable Read-Only Memory (EEPROM). The reserved memory resides on the computing devices and is intended and reserved to store device address information.

Before describing in detail embodiments that are in accordance with the present disclosure, it should be observed that the embodiments reside primarily in combinations of method steps, system elements, and device components related to pairing BLUETOOTH® enabled computing devices. Accordingly, the device components, system elements, and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this document, relative relational terms such as first and second, top and bottom, and the like may be used solely to distinguish one entity or action from another entity or action without necessarily requiring or implying any actual such relationship or order between such entities or actions.

The terms "comprises," "comprising," or any other variation thereof, are intended to cover a non-exclusive inclusion, such that a process, method, article, or device that comprises a list of elements does not include only those elements, but may include other elements not expressly listed or inherent to such process, method, article, or device. An element proceeded by "comprises . . . a" does not, without more constraints, preclude the existence of additional identical elements in the process, method, article, or device that comprises the element.

It will be appreciated that embodiments of the disclosure described herein may be comprised of one or more conventional processors and unique stored program instructions that control the one or more processors to implement, in conjunction with certain non-processor circuits, some, most, or all of the functions of preparing a mobile communications device for pairing with a BLUETOOTH® device described herein. The non-processor circuits may include, but are not limited to, a radio receiver, a radio transmitter, signal drivers, clock circuits, power source circuits, and user input devices. As such, these functions may be interpreted as steps of a method to perform preparing a BLUETOOTH® enabled computing device for pairing with another BLUETOOTH® enabled device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 illustrates an exemplary configuration 100 of a BLUETOOTH® enabled computing device. Specifically, FIG. 1 illustrates an exemplary configuration 100 of a BLUETOOTH® enabled computing device 110 operated by a user 111 in accordance with one embodiment of the present disclosure. BLUETOOTH® enabled computing device 110 may include, but is not limited to, mobile computing devices, stationary computing devices, computing peripheral devices, smart phones, wearable computing devices, medical computing devices, and vehicular computing devices. Alternatively, BLUETOOTH® enabled computing device 110 may be any computing device capable of BLUETOOTH® pairing described herein. In some variations, the characteristics of the described components may be more or less advanced, primitive, or non-functional.

In the exemplary embodiment, BLUETOOTH® enabled computing device 110 includes a processor 120 for executing instructions. In some embodiments, executable instructions are stored in a memory area 130. Processor 120 may include one or more processing units, for example, a multi-core configuration. Memory area 130 is any device allowing information such as executable instructions and/or written works to be stored and retrieved. Memory area 130 may include one or more computer readable media.

BLUETOOTH® enabled computing device 110 also includes at least one input/output component 140 for receiving information from and providing information to user 111. In some examples, input/output component 140 may be of limited functionality or non-functional as in the case of some wearable computing devices. In other examples, input/output component 140 is any component capable of conveying information to or receiving information from user 111. In some embodiments, input/output component 140 includes an output adapter such as a video adapter and/or an audio adapter. Input/output component 140 may alternatively include an output device such as a display device, a liquid crystal display (LCD), organic light emitting diode (OLED) display, or "electronic ink" display, or an audio output device, a speaker or headphones. Input/output component 140 may also include any devices, modules, or structures for receiving input from user 111. Input/output component 140 may therefore include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output and input device of input/output component 140. Input/output component 140 may further include multiple sub-components for carrying out input and output functions.

BLUETOOTH® enabled computing device 110 may also include a communications interface 150, which may be communicatively coupleable to a remote device such as a remote computing device, a remote server, or any other suitable system. Communication interface 150 may include, for example, a wired or wireless network adapter or a wireless data transceiver for use with a mobile phone network, Global System for Mobile communications (GSM), 3G, 4G, or other mobile data network or Worldwide Interoperability for Microwave Access (WIMAX).

Communications interface 150 further includes a BLUETOOTH® transceiver, or BLUETOOTH® interface 160. BLUETOOTH® interface 160 is capable of completing the pairing, bonding, synchronization, and un-pairing steps described herein as well as transmitting communications with other devices. BLUETOOTH® interface 160 may accordingly be used to allow BLUETOOTH® enabled computing device 110 to communicate with any other BLUETOOTH® devices 170.

Generally, BLUETOOTH®-enabled devices establish connection and communications in the following manner A first device ("an advertising device") is placed into pairing mode and advertises its availability via an advertising packet (or a broadcast query). The advertising packet contains a device identifier. Other devices ("scanning devices") may also be placed into pairing mode and scan for available devices. Scanning devices scan by submitting scan requests. In this example, scan requests detect advertised messages sent via broadcast queries such as the advertising packet sent by the advertising device. (Optionally, the scanning devices may send scan requests directly to advertising devices with which they seek to pair. The advertising devices may respond to the scanning device with a scan response, indicating willingness to pair.) The scanning device then sends a connection request to the advertising device. Advertising devices may accept connection request and create a connection with scanning device. Once a connection is established, a communication channel is opened between the advertising and scanning devices. The scanning device sends a pairing request to the advertising device which responds with a pairing response. The pairing response includes a specific device address. Finally, the scanning device completes pairing using the specific device address. At this point, the scanning device and advertising device have established a pairing that may be used for reconnection. They may continue communications or disconnect with the possibility of later reconnection.

Figure 2:
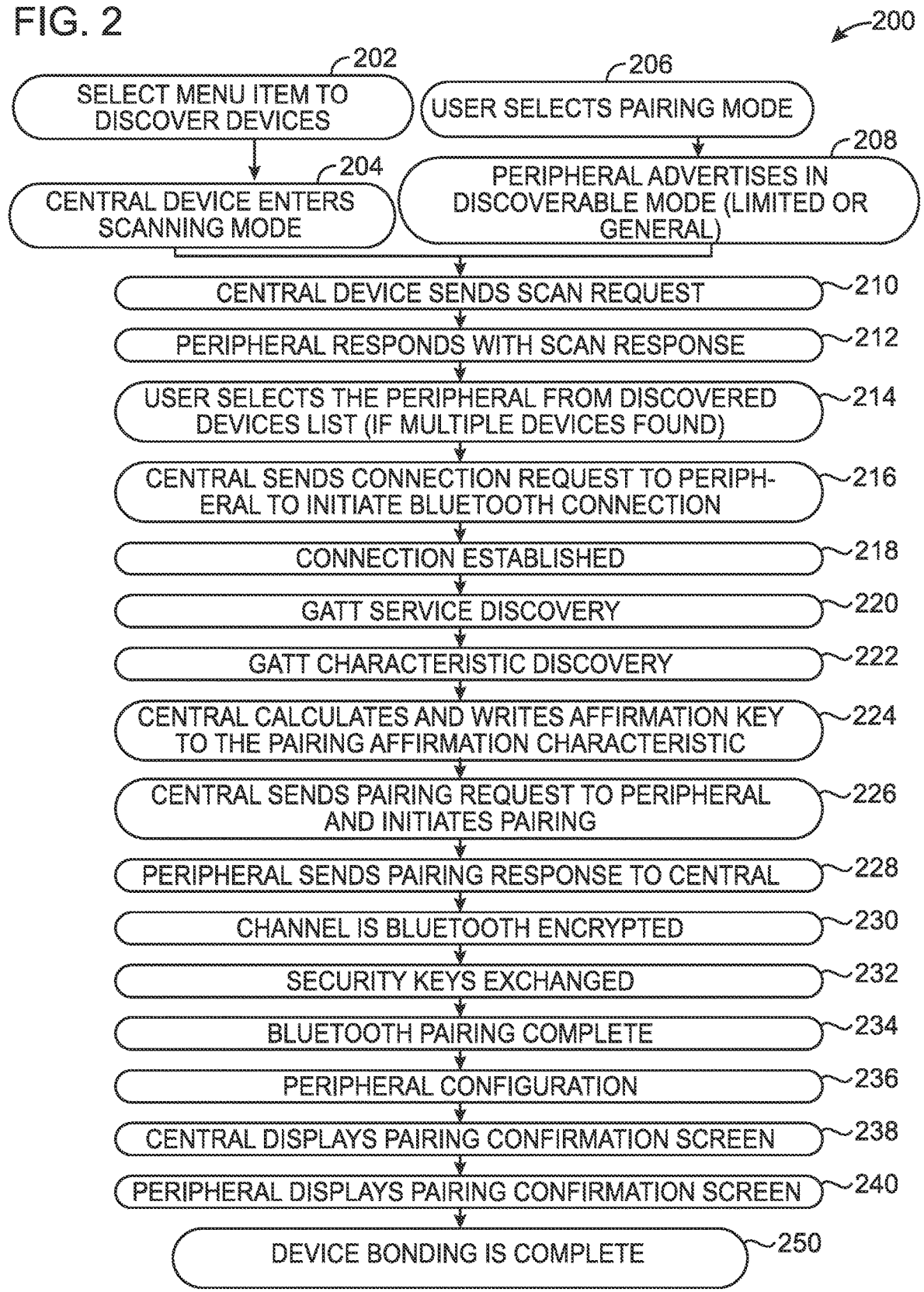
FIG. 2 is a flowchart representing the steps performed by the BLUETOOTH® enabled computing device of FIG. 1 to perform the affirmation of the pairing between devices.

Referring to FIG. 2, a flowchart 200 is shown representing the steps performed by the BLUETOOTH® enabled computing device of FIG. 1 to perform the affirmation of the pairing between the devices. Initially, BLUETOOTH® enabled central device selects 202 a menu item to discover devices and identify potential BLUETOOTH® enabled computing devices that are available for pairing and communication. BLUETOOTH® enabled central device further enters 204 scanning mode. BLUETOOTH® enabled peripheral device selects to enter 206 pairing mode. BLUETOOTH® enabled peripheral device advertises 208 availability for pairing by transmitting advertising data packets. BLUETOOTH® enabled peripheral device may advertise availability for pairing in either a limited or a general mode. Further, in some examples, BLUETOOTH® enabled peripheral device transmits an affirmation value to receiving BLUETOOTH® enabled central devices.

BLUETOOTH® enabled central device sends 210 a scan request and BLUETOOTH® enabled peripheral device replies 212 with a scan response. In some examples, the BLUETOOTH® enabled peripheral device replies 212 by including the affirmation value in the scan response. Upon receiving the scan response, BLUETOOTH® enabled central device selects 214 the BLUETOOTH® enabled peripheral device from a device list if multiple devices are found in scanning. BLUETOOTH® enabled central device further sends 216 a connection request to the BLUETOOTH® enabled peripheral device to initiate a BLUETOOTH® connection 218. Upon connection 218, BLUETOOTH® enabled central device performs GATT service discovery 220 and GATT characteristic discovery 222 to learn the characteristics and services available from BLUETOOTH® enabled peripheral device.

As described herein, authorized BLUETOOTH® enabled central devices are prepared to process the affirmation value into an affirmation key using an affirmation algorithm. BLUETOOTH® enabled central device calculates the affirmation key using the affirmation algorithm on the affirmation value and writes the affirmation key 224 to the affirmation key characteristic (or the pairing affirmation characteristic). BLUETOOTH® enabled central device sends 226 a pairing request to the BLUETOOTH® enabled peripheral device and initiates pairing.

Figure 3:
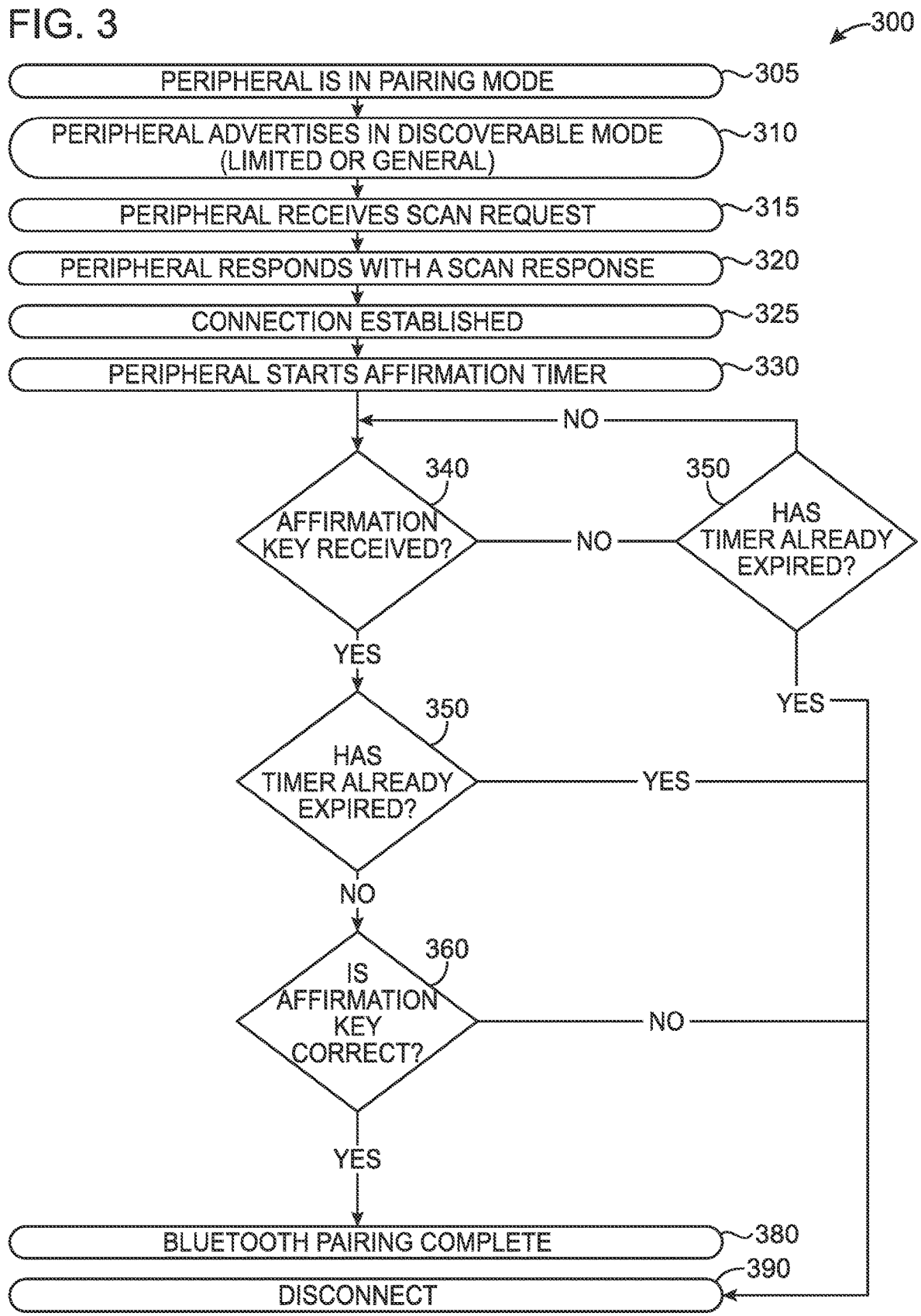
FIG. 3 is a flowchart representing the steps performed by the BLUETOOTH® enabled peripheral device to perform the affirmation of the pairing with the BLUETOOTH® enabled central device.

BLUETOOTH® enabled peripheral device performs a validation process to validate that the affirmation key written to the affirmation key characteristic is valid, as described in FIG. 3. Specifically, BLUETOOTH® enabled peripheral device validates (1) that the affirmation key was written to the affirmation key characteristic before the affirmation timer expired and (2) that the affirmation key was properly processed as expected by the BLUETOOTH® enabled peripheral device. Upon such validation, BLUETOOTH® enabled peripheral device sends 228 a pairing response to BLUETOOTH® enabled central device. The devices begin to use an encrypted BLUETOOTH® communications channel 230 and security keys are exchanged 232 between the BLUETOOTH® enabled peripheral device and the BLUETOOTH® enabled central device. The devices then complete pairing 234, the BLUETOOTH® enabled peripheral device is configured 236, and the BLUETOOTH® enabled computing devices confirm pairing at their respective displays 238 and 240, completing bonding 250.

Referring to FIG. 3, a flowchart 300 is shown representing the steps performed by the BLUETOOTH® enabled peripheral device to perform the affirmation of the pairing with the BLUETOOTH® enabled central device. Initially, BLUETOOTH® enabled peripheral device is set to enter a pairing mode 305 and advertises availability 310 in limited or general availability. The BLUETOOTH® enabled peripheral device may simultaneously provide an affirmation value with the advertisement 310. BLUETOOTH® enabled peripheral device receives a scan request 315 from a BLUETOOTH® enabled central device and responds with a scan response 320. In some examples, the affirmation value is provided with the scan response 320. Upon receipt of a connection request from BLUETOOTH® enabled central device, a connection is established 325 and BLUETOOTH® enabled peripheral device starts an affirmation timer simultaneously 330.

The BLUETOOTH® enabled peripheral device begins a validation process as shown in FIG. 3 in validation steps 340, 350, and 360. BLUETOOTH® enabled peripheral device checks 340 to determine whether an affirmation key has been received. The BLUETOOTH® enabled peripheral device also checks 350 to determine whether the affirmation timer has already expired by the time that check 340 occurred. If checks 340 and 350 are successfully completed (with values of "YES" and "NO", respectively), the BLUETOOTH® enabled peripheral device checks 360 to determine whether the affirmation key is valid. The use of validation steps 340, 350, and 360 in the pairing process is elaborated on below.

The BLUETOOTH® enabled peripheral device checks 340 and determines that an affirmation key has been received or has not been received. If check 340 determines that no affirmation key has been received, the BLUETOOTH® enabled peripheral device checks 350 to determine whether the affirmation timer has expired or has not expired. If the affirmation timer has not expired, the BLUETOOTH® enabled peripheral device is configured to continue waiting and checking 340 until the affirmation timer expires. Thus, if check 340 is determined to be "NO" (indicating that no affirmation key has been received) and check 350 is determined to be "NO" (indicating that the affirmation timer has not expired), the validation process resets and returns back to check 340.

If check 340 is determined to be "NO" (indicating that no affirmation key has been received) and check 350 is determined to be "YES" (indicating that the affirmation timer has expired), the validation process is ended without pairing because no affirmation key was received within the window of the affirmation timer. In such cases, the BLUETOOTH® enabled peripheral device disconnects 390 from the BLUETOOTH® enabled central device.

If check 340 is determined to be "YES" (indicating that an affirmation key has been received), BLUETOOTH® enabled peripheral device checks 350 and determines whether the affirmation key was received before the affirmation timer expired. When check 340 is determined to be "YES" (indicating that an affirmation key was received) and check 350 is determined to be "YES" (indicating that the affirmation timer expired before the affirmation key was received), the validation process is ended without pairing because the affirmation key was received after the window of the affirmation timer. In such cases, the BLUETOOTH® enabled peripheral device disconnects 390 from BLUETOOTH® enabled central device.

When check 340 is determined to be "YES" (indicating that an affirmation key was received) and check 350 is determined to be "NO" (indicating that the affirmation timer had not expired before the affirmation key was received), the validation process continues and the BLUETOOTH® enabled peripheral device checks 360 whether the affirmation key is valid or correct. If check 340 is determined to be "YES" (indicating that an affirmation key was received), check 350 is determined to be "NO" (indicating that the affirmation key was received before the affirmation timer expired), and check 360 is determined to be "YES" (indicating that the affirmation key is valid), the BLUETOOTH® enabled peripheral device pairs with the BLUETOOTH® enabled central device and the pairing process is completed 380.

However, if check 340 is determined to be "YES" (indicating that an affirmation key was received), check 350 is determined to be "NO" (indicating that the affirmation key was received before the affirmation timer expired), and check 360 is determined to be "NO" (indicating that the affirmation key is invalid), the validation process is ended without pairing because no valid affirmation key was received within the window of the affirmation timer. In such cases, the BLUETOOTH® enabled peripheral device disconnects 390.

As described herein, check 340 includes determining whether the affirmation key characteristic has been updated by BLUETOOTH® enabled central device, thereby indicating that an affirmation key was received. As described herein, check 350 includes determining whether a defined period of time has passed before the affirmation key was received, indicating that the affirmation timer expired before the affirmation key was received. In the example embodiment, the defined period is two seconds. In other examples, the defined period may be shorter or longer, depending on the goals for device pairing in the device configuration. Also as described herein, BLUETOOTH® enabled peripheral device checks 360 to see whether the affirmation key is correct (or valid). As described, BLUETOOTH® enabled peripheral device processes the affirmation value to create a reference affirmation key and compares the received affirmation key to the reference affirmation key. If the affirmation key is received before the affirmation timer expires, the BLUETOOTH® enabled peripheral device compares the reference affirmation key to the received affirmation key. If the received affirmation key matches the reference affirmation key, check 360 passes (with a "YES" value) and the affirmation key is determined to be valid, thus causing device pairing 380 to be completed.

Figure 4:
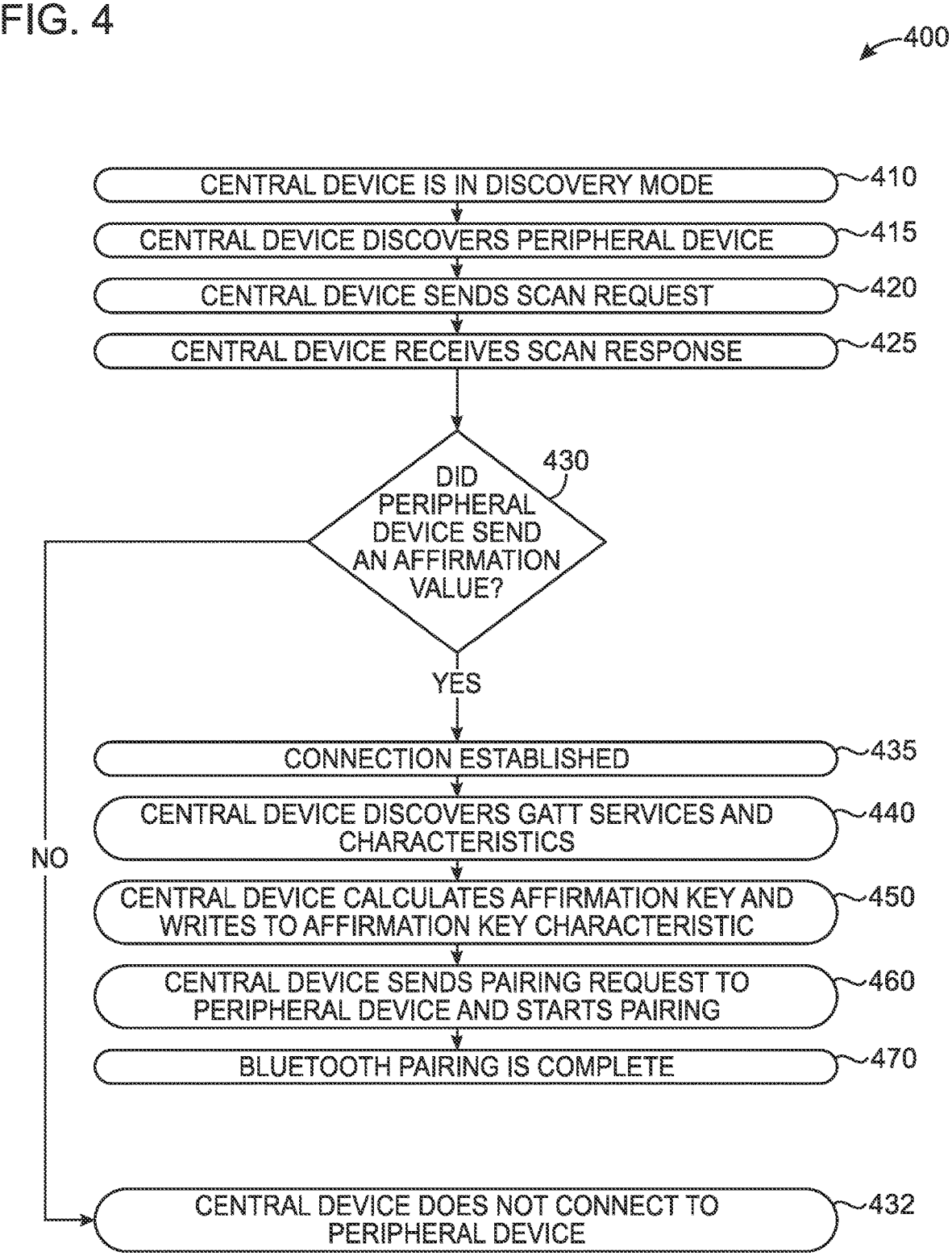
FIG. 4 is a flowchart representing the steps performed by the BLUETOOTH® enabled central device to perform the affirmation of the pairing with the BLUETOOTH® enabled peripheral device.

Referring to FIG. 4, a flowchart 400 is shown representing the steps performed by the BLUETOOTH® enabled central device to perform the affirmation of the pairing with the BLUETOOTH® enabled peripheral device. BLUETOOTH® enabled central device is set 410 to discovery mode and discovers 415 BLUETOOTH® enabled peripheral device. BLUETOOTH® enabled central device sends 420 a scan request and receives 425 a scan response from BLUETOOTH® enabled peripheral device. As described, BLUETOOTH® enabled central device may receive an affirmation value in either 1) advertising packets received during discovery of BLUETOOTH® enabled peripheral device or 2) the scan response. Accordingly, BLU- ETOOTH® enabled central device checks 430 to determine whether it received an affirmation value. If BLUETOOTH® enabled central device does not receive an affirmation value, BLUETOOTH® enabled central device does not connect 432 to peripheral device.

If BLUETOOTH® enabled central device receives an affirmation value, it continues with the process of pairing by establishing a connection 435 and performing GATT service and characteristic discovery 440. Based on discovery 440 and an affirmation algorithm, BLUETOOTH® enabled central device calculates an affirmation key from the affirmation value and writes the affirmation key 450 to an affirmation key characteristic. BLUETOOTH® enabled central device sends a pairing request 460 to BLUETOOTH® enabled peripheral device and, if the affirmation key is validated by BLUETOOTH® enabled peripheral device, pairing begins. BLUETOOTH® enabled central device completes pairing 470.

Figure 5:
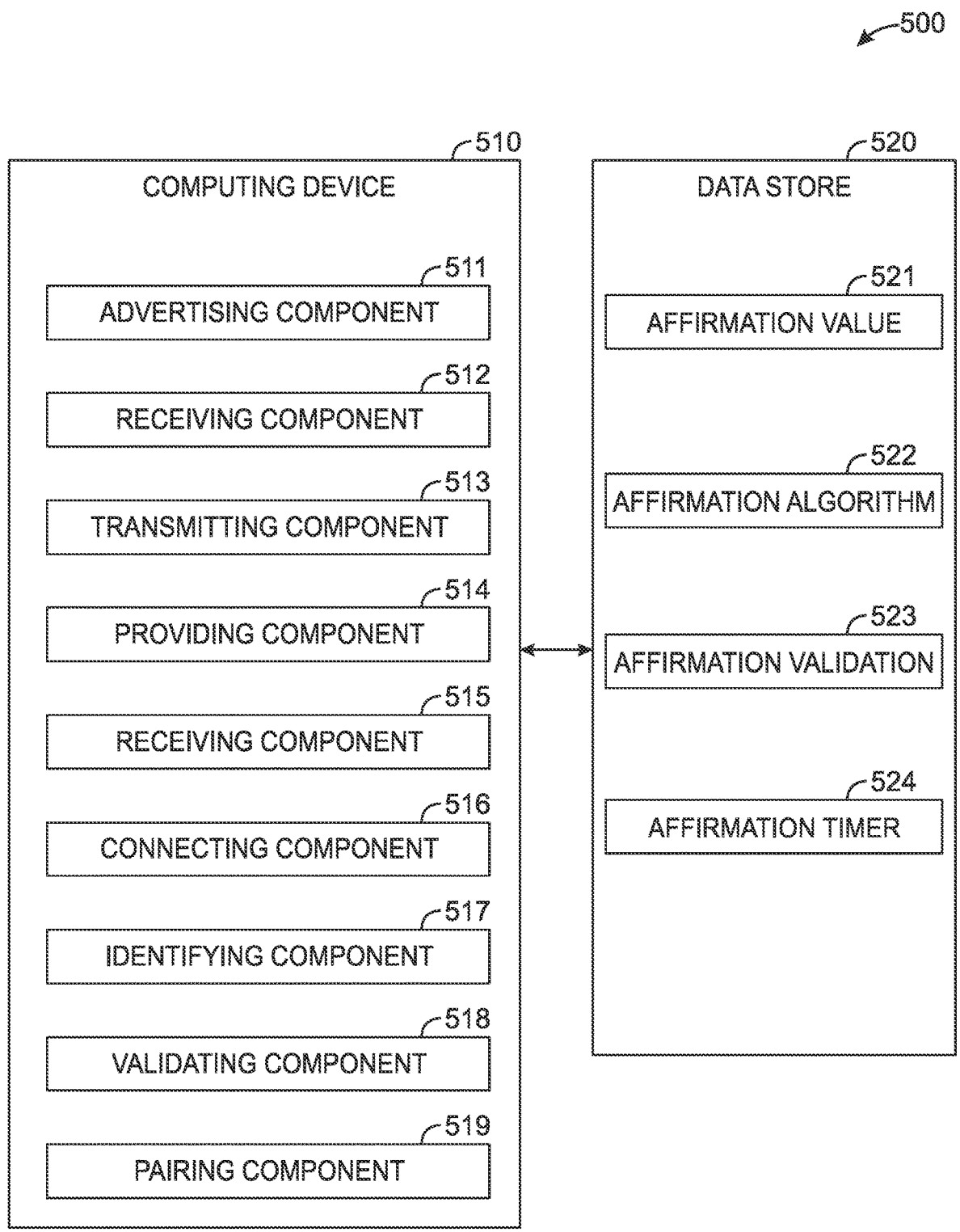
FIG. 5 is a diagram of elements of one or more example computing devices that may be used in the methods shown in FIGS. 2, 3, and 4.

FIG. 5 is a diagram 500 of components of one or more example computing devices that may be used in the methods shown in FIGS. 2, 3, and 4. In some embodiments, computing device 510 is similar to BLUETOOTH® enabled computing device 110.

Data store 520 may be stored at memory 130 (shown in FIG. 1) or any other suitable location. Data store 520 may be coupled with several separate components 511, 512, 513, 514, 515, 516, 517, 518, and 519 within computing device 510, which perform specific tasks.

In this embodiment, data store 520 includes affirmation value 521 (which is recycled on a period basis), affirmation algorithm 522 (which may be subdivided and specific to BLUETOOTH® enabled central device types), affirmation validation method 523, and affirmation timer method 524.

Computing device 510 also includes an advertising component 511 for advertising availability of the BLUETOOTH® enabled peripheral computing device for pairing, a receiving component 512 for receiving a scan request from a BLUETOOTH® enabled central computing device, a transmitting component 513 for transmitting a scan response to the BLUETOOTH® enabled central computing device in response to the scan request, a providing component 514 for providing an affirmation value to the BLUETOOTH® enabled central computing device, a receiving component 515 for receiving a connection request from the BLUETOOTH® enabled central computing device, a connecting component 516 for establishing a connection with the BLUETOOTH® enabled central computing device, an identifying component 517 for identifying an affirmation key provided by the BLUETOOTH® enabled central computing device, wherein the affirmation key is provided within an affirmation key characteristic, a validating component 518 for validating that the affirmation key is valid, and a pairing component 519 for pairing with the BLUETOOTH® enabled central computing device.

The systems and processes are not limited to the specific embodiments described herein. In addition, components of each system and each process can be practiced independent and separate from other components and processes described herein. Each component and process also can be used in combination with other assembly packages and processes.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

All of the patents, patent applications, patent application publications and other publications recited herein are hereby incorporated by reference as if set forth in their entirety.

The present inventive concept has been described in connection with what are presently considered to be the most practical and preferred embodiments. However, the inventive concept has been presented by way of illustration and is not intended to be limited to the disclosed embodiments. Accordingly, one of skill in the art will realize that the inventive concept is intended to encompass all modifications and alternative arrangements within the spirit and scope of the inventive concept as set forth in the appended claims. Numbered embodiments are presented below.

Numbered Embodiments

In addition or as an alternative to the above, the following embodiments are described:

1. A method for affirming a pairing of BLUETOOTH® enabled devices performed by a BLUETOOTH® enabled peripheral computing device, the method comprising:
   a) advertising availability of the BLUETOOTH® enabled peripheral computing device for pairing;
   b) receiving a scan request from a BLUETOOTH® enabled central computing device;
   c) transmitting a scan response to the BLUETOOTH® enabled central computing device in response to the scan request;

d) providing an affirmation value to the BLUETOOTH® enabled central computing device;
e) receiving a connection request from the BLUETOOTH® enabled central computing device;
f) establishing a connection with the BLUETOOTH® enabled central computing device;
g) identifying an affirmation key provided by the BLUETOOTH® enabled central computing device, wherein the affirmation key is provided within an affirmation key characteristic;
h) validating that the affirmation key is valid; and
i) pairing with the BLUETOOTH® enabled central computing device.

2. The method according to Embodiment 1, further comprising:
providing the affirmation value to the BLUETOOTH® enabled central computing device, wherein the affirmation value is embedded within a set of data packets sent when advertising the availability of the BLUETOOTH® enabled peripheral computing device.

3. The method according to at least one of the previous Embodiments further comprising:
providing the affirmation value to the BLUETOOTH® enabled central computing device, wherein the affirmation value is embedded within the scan response.

4. The method according to at least one of the previous Embodiments, wherein validating that the affirmation key is valid further comprises:
processing the affirmation value with an affirmation algorithm to calculate a reference affirmation key; and
validating that the affirmation key matches the reference affirmation key.

5. The method according to at least one of the previous Embodiments, further comprising:
deleting the reference affirmation key from local memory.

6. The method according to at least one of the previous Embodiments, wherein validating that the affirmation key is valid further comprises:
identifying a timer interval defining the period that the BLUETOOTH® enabled central computing device has to respond to the affirmation value by transmitting the affirmation key characteristic including the affirmation key;
initiating an affirmation timer upon establishing a connection with the BLUETOOTH® enabled central computing device;
measuring a timer value of the affirmation timer when the affirmation key characteristic is provided by the BLUETOOTH® enabled central computing device; and
validating that the timer value is less than the timer interval.

7. The method according to at least one of the previous Embodiments, further comprising:
a) receiving a reconnection request from a previously paired BLUETOOTH® enabled central computing device;
b) providing a second affirmation value to the BLUETOOTH® enabled central computing device;
c) identifying a second affirmation key provided by the BLUETOOTH® enabled central computing device, wherein the second affirmation key is provided within a second affirmation key characteristic;
d) validating that the second affirmation key is valid by processing the second affirmation value with an affirmation algorithm to calculate a second reference affirmation key and validating that the second affirmation key matches the second reference affirmation key; and
e) reconnecting with the BLUETOOTH® enabled central computing device.

8. The method according to at least one of the previous Embodiments, further comprising:
identifying a timer interval defining the period that the BLUETOOTH® enabled central computing device has to respond to the affirmation value by transmitting the affirmation key characteristic including the affirmation key;
initiating an affirmation timer upon establishing a connection with the BLUETOOTH® enabled central computing device;
determining that the timer value of the affirmation timer exceeds the timer interval; and
providing a replacement affirmation value to the BLUETOOTH® enabled central computing device.

9. A system for affirming a pairing of BLUETOOTH® enabled devices, the system comprising:
a BLUETOOTH® enabled peripheral computing device comprising a first processor, a first memory, and a first transceiver; and
a central BLUETOOTH® enabled computing device comprising a second processor, a second memory, and a second transceiver,
wherein said first processor is configured to:
a) advertise availability of the BLUETOOTH® enabled peripheral computing device for pairing;
b) receive a scan request from the BLUETOOTH® enabled central computing device;
c) transmit a scan response to the BLUETOOTH® enabled central computing device in response to the scan request;
d) provide an affirmation value to the BLUETOOTH® enabled central computing device;
e) receive a connection request from the BLUETOOTH® enabled central computing device;
f) establish a connection with the BLUETOOTH® enabled central computing device;
g) identify an affirmation key provided by the BLUETOOTH® enabled central computing device, wherein the affirmation key is provided within an affirmation key characteristic;
h) validate that the affirmation key is valid; and
i) pair with the BLUETOOTH® enabled central computing device.

10. The system of Embodiment 9, wherein said first processor is further configured to:
provide the affirmation value to the BLUETOOTH® enabled central computing device, wherein the affirmation value is embedded within a set of data packets sent when advertising the availability of the BLUETOOTH® enabled peripheral computing device.

11. The system of at least one of the previous Embodiments, wherein said first processor is further configured to:
provide the affirmation value to the BLUETOOTH® enabled central computing device, wherein the affirmation value is embedded within the scan response.

12. The system of at least one of the previous Embodiments, wherein said first processor is further configured to:
process the affirmation value with an affirmation algorithm to calculate a reference affirmation key; and
validate that the affirmation key matches the reference affirmation key.

13. The system of at least one of the previous Embodiments, wherein said first processor is further configured to:
delete the reference affirmation key from local memory.

14. The system of at least one of the previous Embodiments, wherein said first processor is further configured to:
  identify a timer interval defining the period that the BLUETOOTH® enabled central computing device has to respond to the affirmation value by transmitting the affirmation key characteristic including the affirmation key;
  initiate an affirmation timer upon establishing a connection with the BLUETOOTH® enabled central computing device;
  measure a timer value of the affirmation timer when the affirmation key characteristic is provided by the BLUETOOTH® enabled central computing device; and
  validate that the timer value is less than the timer interval.

15. The system of at least one of the previous Embodiments, wherein said first processor is further configured to:
  a) receive a reconnection request from a previously paired BLUETOOTH® enabled central computing device;
  b) provide a second affirmation value to the BLUETOOTH® enabled central computing device;
  c) identify a second affirmation key provided by the BLUETOOTH® enabled central computing device, wherein the second affirmation key is provided within a second affirmation key characteristic;
  d) validate that the second affirmation key is valid by processing the second affirmation value with an affirmation algorithm to calculate a second reference affirmation key and validating that the second affirmation key matches the second reference affirmation key; and
  e) reconnect with the BLUETOOTH® enabled central computing device.

16. The system of at least one of the previous Embodiments, wherein the first processor is further configured to:
  identify a timer interval defining the period that the BLUETOOTH® enabled central computing device has to respond to the affirmation value by transmitting the affirmation key characteristic including the affirmation key;
  initiate an affirmation timer upon establishing a connection with the BLUETOOTH® enabled central computing device;
  determine that the timer value of the affirmation timer exceeds the timer interval; and
  provide a replacement affirmation value to the BLUETOOTH® enabled central computing device.

17. A BLUETOOTH® enabled central computing device for affirming a BLUETOOTH® pairing, said central computing device comprising:
  a processor, a memory, and a transceiver, said processor configured to:
  a) transmit a scan request to a BLUETOOTH® enabled peripheral computing device, wherein the BLUETOOTH® enabled peripheral computing device is advertising availability for pairing;
  b) receive a scan response from the BLUETOOTH® enabled peripheral computing device in response to the scan request;
  c) receive an affirmation value from the BLUETOOTH® enabled peripheral computing device;
  d) calculate an affirmation key by applying an affirmation algorithm to the affirmation value;
  e) transmit a connection request to the BLUETOOTH® enabled peripheral computing device;
  f) establish a connection with the BLUETOOTH® enabled peripheral computing device;
  g) write the affirmation key to an affirmation key characteristic associated with the connection;
  h) transmit a pairing request to the BLUETOOTH® enabled peripheral computing device; and
  i) pair with the BLUETOOTH® enabled peripheral computing device, wherein the pairing is initiated upon the validation of the affirmation key by the BLUETOOTH® enabled peripheral computing device.

18. The BLUETOOTH® enabled central computing device of Embodiment 17, wherein said processor is further configured to:
  receive the affirmation value from the BLUETOOTH® enabled peripheral computing device, wherein the affirmation value is embedded within a set of data packets sent when the BLUETOOTH® enabled peripheral computing device advertises its availability for pairing.

19. The BLUETOOTH® enabled computing device of at least one of the previous Embodiments, wherein said processor is further configured to:
  receive the affirmation value from the BLUETOOTH® enabled peripheral computing device, wherein the affirmation value is embedded within the scan response.

20. The BLUETOOTH® enabled computing device of at least one of the previous Embodiments, wherein said processor is further configured to:
  discover services and characteristics associated with the BLUETOOTH® enabled peripheral computing device; and
  write the affirmation key to the affirmation key characteristic based upon the discovered characteristics.

LISTING OF REFERENCE NUMBERS

100 Configuration
110 BLUETOOTH®-enabled computing device
111 User
120 Processor
130 Memory area
140 Input/output component
150 Communication interface
160 BLUETOOTH® interface
170 Additional BLUETOOTH® devices
200 Flowchart
202 Select menu item to discover devices
204 Central device enters scanning mode
206 User selects pairing mode
208 Peripheral advertises in discoverable mode
210 Central device sends scan request
212 Peripheral responds with scan response
214 User selects peripheral from discovered devices list
216 Central sends connection request to peripheral
218 Connection established
220 GATT service discovery
222 GATT characteristic discovery
224 Central calculates and writes affirmation key
226 Central sends pairing request
228 Peripheral sends pairing response
230 Channel is encrypted
232 Security keys exchanged
234 Pairing complete
236 Peripheral configuration
238 Central displays pairing confirmation
240 Peripheral displays pairing confirmation
250 Device bonding complete
300 Flowchart
305 Peripheral is in pairing mode
310 Peripheral advertises in discoverable mode
315 Peripheral receives scan request 320 Peripheral responds with scan response
325 Connection established
330 Peripheral starts affirmation timer
340 Has affirmation key been received?
350 Has timer already expired?
360 Is affirmation key correct?
380 Pairing complete
390 Disconnect
400 Flowchart
410 Central device in discovery mode
415 Central device discovers peripheral device
420 Central device sends scan request
425 Central device receives scan response
430 Did peripheral device send affirmation value?
432 Central device does not connect to peripheral device
435 Connection established
440 Central device discovers GATT services and characteristics
450 Central device calculates affirmation key and writes affirmation key
460 Central device sends pairing request to peripheral device
470 Pairing complete
500 Diagram
510 Computing device
511 Advertising component
512 Receiving component
513 Transmitting component
514 Providing component
515 Receiving component
516 Connecting component
517 Identifying component
518 Validating component
519 Pairing component
520 Data store
521 Affirmation value
522 Affirmation algorithm
523 Affirmation validation
524 Affirmation timer

What is claimed:

1. A method for affirming a pairing of BLUETOOTH® enabled devices performed by a BLUETOOTH® enabled peripheral computing device, the method comprising:
 a) advertising availability of the BLUETOOTH® enabled peripheral computing device for pairing;
 b) receiving a scan request from a BLUETOOTH® enabled central computing device;
 c) transmitting a scan response to the BLUETOOTH® enabled central computing device in response to the scan request;
 d) providing an affirmation value to the BLUETOOTH® enabled central computing device;
 e) receiving a connection request from the BLUETOOTH® enabled central computing device;
 f) establishing a connection with the BLUETOOTH® enabled central computing device;
 g) identifying an affirmation key provided by the BLUETOOTH® enabled central computing device, wherein the affirmation key is provided within an affirmation key characteristic;
 h) validating that the affirmation key is valid; and
 i) pairing with the BLUETOOTH® enabled central computing device.

2. The method according to claim 1, further comprising: providing the affirmation value to the BLUETOOTH® enabled central computing device, wherein the affirmation value is embedded within a set of data packets sent when advertising the availability of the BLUETOOTH® enabled peripheral computing device.

3. The method according to claim 1, further comprising: providing the affirmation value to the BLUETOOTH® enabled central computing device, wherein the affirmation value is embedded within the scan response.

4. The method according to claim 1, wherein validating that the affirmation key is valid further comprises:
 processing the affirmation value with an affirmation algorithm to calculate a reference affirmation key; and
 validating that the affirmation key matches the reference affirmation key.

5. The method according to claim 4, further comprising: deleting the reference affirmation key from local memory.

6. The method according to claim 1, wherein validating that the affirmation key is valid further comprises:
 identifying a timer interval defining the period that the BLUETOOTH® enabled central computing device has to respond to the affirmation value by transmitting the affirmation key characteristic including the affirmation key;
 initiating an affirmation timer upon establishing a connection with the BLUETOOTH® enabled central computing device;
 measuring a timer value of the affirmation timer when the affirmation key characteristic is provided by the BLUETOOTH® enabled central computing device; and
 validating that the timer value is less than the timer interval.

7. The method according to claim 1, further comprising:
 a) receiving a reconnection request from a previously paired BLUETOOTH® enabled central computing device;
 b) providing a second affirmation value to the BLUETOOTH® enabled central computing device;
 c) identifying a second affirmation key provided by the BLUETOOTH® enabled central computing device, wherein the second affirmation key is provided within a second affirmation key characteristic;
 d) validating that the second affirmation key is valid by processing the second affirmation value with an affirmation algorithm to calculate a second reference affirmation key and validating that the second affirmation key matches the second reference affirmation key; and
 e) reconnecting with the BLUETOOTH® enabled central computing device.

8. The method according to claim 1, further comprising:
 identifying a timer interval defining the period that the BLUETOOTH® enabled central computing device has to respond to the affirmation value by transmitting the affirmation key characteristic including the affirmation key;
 initiating an affirmation timer upon establishing a connection with the BLUETOOTH® enabled central computing device;
 determining that the timer value of the affirmation timer exceeds the timer interval; and
 providing a replacement affirmation value to the BLUETOOTH® enabled central computing device.

9. A system for affirming a pairing of BLUETOOTH® enabled devices, the system comprising:
 a BLUETOOTH® enabled peripheral computing device comprising a first processor, a first memory, and a first transceiver; and a central BLUETOOTH® enabled computing device comprising a second processor, a second memory, and a second transceiver, wherein said first processor is configured to:
a) advertise availability of the BLUETOOTH® enabled peripheral computing device for pairing;
b) receive a scan request from the BLUETOOTH® enabled central computing device;
c) transmit a scan response to the BLUETOOTH® enabled central computing device in response to the scan request;
d) provide an affirmation value to the BLUETOOTH® enabled central computing device;
e) receive a connection request from the BLUETOOTH® enabled central computing device;
f) establish a connection with the BLUETOOTH® enabled central computing device;
g) identify an affirmation key provided by the BLUETOOTH® enabled central computing device, wherein the affirmation key is provided within an affirmation key characteristic;
h) validate that the affirmation key is valid; and
i) pair with the BLUETOOTH® enabled central computing device.

10. The system of claim 9, wherein said first processor is further configured to:
provide the affirmation value to the BLUETOOTH® enabled central computing device, wherein the affirmation value is embedded within a set of data packets sent when advertising the availability of the BLUETOOTH® enabled peripheral computing device.

11. The system of claim 9, wherein said first processor is further configured to:
provide the affirmation value to the BLUETOOTH® enabled central computing device, wherein the affirmation value is embedded within the scan response.

12. The system of claim 9, wherein said first processor is further configured to:
process the affirmation value with an affirmation algorithm to calculate a reference affirmation key; and
validate that the affirmation key matches the reference affirmation key.

13. The system of claim 12, wherein said first processor is further configured to:
delete the reference affirmation key from local memory.

14. The system of claim 9, wherein said first processor is further configured to:
identify a timer interval defining the period that the BLUETOOTH® enabled central computing device has to respond to the affirmation value by transmitting the affirmation key characteristic including the affirmation key;
initiate an affirmation timer upon establishing a connection with the BLUETOOTH® enabled central computing device;
measure a timer value of the affirmation timer when the affirmation key characteristic is provided by the BLUETOOTH® enabled central computing device; and
validate that the timer value is less than the timer interval.

15. The system of claim 9, wherein said first processor is further configured to:
a) receive a reconnection request from a previously paired BLUETOOTH® enabled central computing device;
b) provide a second affirmation value to the BLUETOOTH® enabled central computing device;
c) identify a second affirmation key provided by the BLUETOOTH® enabled central computing device, wherein the second affirmation key is provided within a second affirmation key characteristic;
d) validate that the second affirmation key is valid by processing the second affirmation value with an affirmation algorithm to calculate a second reference affirmation key and validating that the second affirmation key matches the second reference affirmation key; and
e) reconnect with the BLUETOOTH® enabled central computing device.

16. The system of claim 9, wherein the first processor is further configured to:
identify a timer interval defining the period that the BLUETOOTH® enabled central computing device has to respond to the affirmation value by transmitting the affirmation key characteristic including the affirmation key;
initiate an affirmation timer upon establishing a connection with the BLUETOOTH® enabled central computing device;
determine that the timer value of the affirmation timer exceeds the timer interval; and
provide a replacement affirmation value to the BLUETOOTH® enabled central computing device.

17. A BLUETOOTH® enabled central computing device for affirming a BLUETOOTH® pairing, said central computing device comprising:
a processor, a memory, and a transceiver, said processor configured to:
a) transmit a scan request to a BLUETOOTH® enabled peripheral computing device, wherein the BLUETOOTH® enabled peripheral computing device is advertising availability for pairing;
b) receive a scan response from the BLUETOOTH® enabled peripheral computing device in response to the scan request;
c) receive an affirmation value from the BLUETOOTH® enabled peripheral computing device;
d) calculate an affirmation key by applying an affirmation algorithm to the affirmation value;
e) transmit a connection request to the BLUETOOTH® enabled peripheral computing device;
f) establish a connection with the BLUETOOTH® enabled peripheral computing device;
g) write the affirmation key to an affirmation key characteristic associated with the connection;
h) transmit a pairing request to the BLUETOOTH® enabled peripheral computing device; and
i) pair with the BLUETOOTH® enabled peripheral computing device, wherein the pairing is initiated upon the validation of the affirmation key by the BLUETOOTH® enabled peripheral computing device.

18. The BLUETOOTH® enabled central computing device of claim 17, wherein said processor is further configured to:
receive the affirmation value from the BLUETOOTH® enabled peripheral computing device, wherein the affirmation value is embedded within a set of data packets sent when the BLUETOOTH® enabled peripheral computing device advertises its availability for pairing.

19. The BLUETOOTH® enabled computing device of claim 17, wherein said processor is further configured to:
receive the affirmation value from the BLUETOOTH® enabled peripheral computing device, wherein the affirmation value is embedded within the scan response.

20. The BLUETOOTH® enabled computing device of claim 17, wherein said processor is further configured to:

discover services and characteristics associated with the BLUETOOTH® enabled peripheral computing device; and write the affirmation key to the affirmation key characteristic based upon the discovered characteristics.

* * * * *